United States Patent [19]

Tsuchiya et al.

[11] Patent Number: 4,828,738
[45] Date of Patent: May 9, 1989

[54] SOLID ELECTROLYTIC CAPACITOR

[75] Inventors: Sohji Tsuchiya, Tsukui; Toshikuni Kojima, Kawasaki; Yasuo Kudoh, Yokohama; Susumu Yoshimura, Yokohama; Yasunari Hoshii, Nishio; Hirohiko Itoh, Nagoya, all of Japan

[73] Assignees: Matsushita Electric Industrial Co., Ltd., Osaka; Takomoto Oil & Fat Co., Ltd., Aichi, both of Japan

[21] Appl. No.: 122,231

[22] Filed: Nov. 13, 1987

[30] Foreign Application Priority Data

Nov. 14, 1986 [JP] Japan .................. 61-272421

[51] Int. Cl.$^4$ ........................................ H01G 9/02
[52] U.S. Cl. ................................ 252/62.2; 361/527
[58] Field of Search .................. 252/62.2; 361/433.5

[56] References Cited

U.S. PATENT DOCUMENTS

| | | | |
|---|---|---|---|
| 3,872,358 | 3/1975 | Murakami et al. | 252/62.2 |
| 3,898,539 | 8/1975 | Yoshimura et al. | 361/433.5 |
| 3,916,267 | 10/1975 | Yasuda et al. | 252/62.2 |
| 3,941,792 | 3/1976 | Murakami | 252/62.2 |
| 3,946,289 | 3/1976 | Yasuda | 252/62.2 |
| 4,580,855 | 4/1986 | Niwa | 252/62.2 |
| 4,590,541 | 5/1986 | Takahashi et al. | 252/62.2 |
| 4,679,124 | 7/1987 | Yoshimura et al. | 252/62.2 |
| 4,688,153 | 8/1987 | Ebisawa et al. | 252/62.2 |
| 4,729,844 | 3/1988 | Tsuchiya et al. | 361/433.5 |

OTHER PUBLICATIONS

Kirk-Othmer "Fluorinated Aliphatic Compounds", vol. 10, 3rd ed. 1980, pp. 856–870.

Primary Examiner—John F. Niebling
Assistant Examiner—Steven P. Marquis
Attorney, Agent, or Firm—Wenderoth, Lind & Ponack

[57] ABSTRACT

The present invention provides a solid electrolytic capacitor which comprises a first electrode comprising a valve action metal plate one surface of which is covered by an anodic oxidation film, a second electrode which faces the surface of the first electrode having the anodic oxidation film and a layer of a solid electrolyte which is placed between the first and second electrodes and comprises a salt of 7,7,8,8-tetracyanoquinodimethane with a cation of quinoline or isoquinoline the nitrogen atom of which is quarternarized with fluorinated alkyl groups, which has improved reliability at high temperature and increased capacitance, and decreases the formation of poisonous gas during pyrolysis.

4 Claims, 1 Drawing Sheet

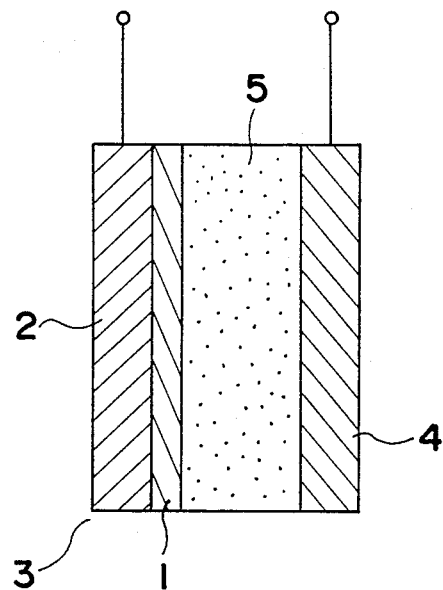
Figure

SOLID ELECTROLYTIC CAPACITOR

BACKGROUND OF THE INVENTION

1. Field of the Invention

The present invention relates to a solid electrolytic capacitor. More particularly, it relates to a solid electrolytic capacitor comprising an organic semiconductor as a solid electrolyte.

2. Description of the Prior Arts

Recently, as electrical equipment circuits are digitized, a small capacitor having low impedance in a high frequency range and large capacity is increasingly required. Hitherto, as a capacitor for use in the high frequency range, a plastic film capacitor, a mica capacitor and a laminated ceramic capacitor are known and used. However, since the film capacitor and mica capacitor are large in size, it is difficult to increase their capacity. The laminated ceramic capacitor has deteriorated temperature characteristics, as it is miniaturized with increasing capacity, so that its production cost considerably increases. As a capacitor with large capacity, an aluminum dry electrolytic capacitor and an aluminum or tantalum solid electrolytic capacitor are known. These capacitors can be made to have large capacity since an anodic oxidation film which serves as a dielectric of the capacitor can be made very thin. However, since the anodic oxidation film tends to be easily damaged, an electrolyte to repair damage of the oxidation film should be provided between the film and a cathode. The aluminum wet electrolytic capacitor is prepared by winding a pair of etched aluminum foils for an anode and a cathode with inserting between them a separator made of paper impregnated with a liquid electrolyte. Therefore, its capacitance decreases and/or loss angle (tan δ) increases as time passes due to leakage or evaporation of the liquid electrolyte. Further, it has very poor high frequency characteristics and low temperature property because of electrolytic conductivity. The aluminum or tantalum solid electrolytic capacitor utilizes manganese dioxide as a solid electrolyte to overcome the above drawbacks of the aluminum wet electrolytic capacitor. The manganese dioxide solid electrolyte is prepared by dipping an anode element in an aqueous solution of manganese nitrate followed by pyrolysis at about 350° C. Since this type capacitor comprises the solid electrolyte at high temperature, it does not suffer from leakage of the electrolyte or decrease of performance due to solidification of the electrolyte in a low temperature range, so that it has better frequency and temperature characteristics than a capacitor comprising a liquid electrolyte. However, its impedance or tan δ in a high frequency range is ten times or more larger than that of the laminated ceramic capacitor or the plastic film capacitor because of damage of the anodic oxidation film by pyrolysis of the manganese nitrate and large resistivity of manganese dioxide.

To solve the problems of the above described capacitors, it is proposed to use an organic semiconductor, namely 7,7,8,8-tetracyanoquinodimethane (hereinafter referred to as "TCNQ") complex as a solid electrolyte, since it has large conductivity and good anodic oxidation property. This organic semiconductor can be incorporated in the anodic oxidation film by dissolving it in an organic solvent or by melting it at high temperature and prevent damage of the oxidation film during pyrolysis for the formation of manganese dioxide. Since the TCNQ complex has large conductivity and good anodic oxidation property, it can provide a capacitor having improved high frequency characteristics and large capacity. For example, Japanese Patent Kokai Publication No. 17609/1983 discloses use of an organic semiconductor comprising N-n-propyl- or N-isopropyl-isoquinoline and TCNQ as a solid electrolyte in a capacitor. According to said invention, the TCNQ salt is impregnated in a wind type aluminum electrolytic capacitor by melting the TCNQ salt. Thereby, an aluminum capacitor having greatly improved frequency and temperature characteristics is produced since strong bonding is formed between the TCNQ salt and the anodic oxidation film and also the TCNQ salt has large conductivity. As the aforementioned Japanese Patent Publication discloses the use of organic semiconductor comprising the TCNQ salt as the solid electrolyte, a capacitor comprising the organic semicondutor has better frequency and temperature characteristics than the solid electrolytic capacitor comprising manganese dioxide since the TCNQ salt has larger conductivity and better anodic oxidation performance (repairing property). According to said Publication, TCNQ salt comprising a cation of isoquinoline the nitrogen atom of which has been quarternarized with alkyl groups is molten and impregnated in the anodic oxidation film.

The TCNQ salt comprising a cation of isoquinoline the nitrogen atom of which has been quarternarized with alkyl groups has varying melting properties and heat stability with the kind of alkyl groups. Further, since such salt has different conductivity and bonding property with the oxidation film which serves as a dielectric film, the characteristics of capacitor vary with the kind of alkyl groups. Although the TCNQ salt containing an isoamyl or n-butyl group achieves excellent characteristics of the capacitor, the following factors should be taken into consideration:

(1) Reliability after kept standing at high temperature.
(2) Achieved capacitance by electrolyte used.
(3) Generation of poisonous gas during pyrolysis.

Fluctuation of the capacitor characteristics after kept standing at high temperature includes decrease of capacity increase of tan δ, increase of leakage current and the like. Quality assurance temperature of the conventional capacitor is usually 85° C. and at most 105° C.

The conventional dielectric film is etched to form micropores so as to increase capacitance of the capacitor. Since a solution type electrolyte can be well trapped by the micropores, it can achieve largest capacitance (the capacitance achieved by the liquid electrolyte is regarded as 100%). However, the TCNQ salt can achieve only 70 to 80 % capacitance.

In addition, the TCNQ salt has a cyano group, it will generate a poisonous cyanide gas at a temperature higher than its decomposition temperature.

SUMMARY OF THE INVENTION

One object of the present invention is to provide a solid electrolytic capacitor having improved reliability at high temperature.

Another object of the present invention is to increase capacitance of a solid electrolytic capacitor.

Further object of the present invention is to suppress generation of poisonous gas during pyrolysis.

According to the present invention, there is provided a solid electrolytic capacitor comprising a first electrode comprising a valve action metal plate one surface of which is covered by an anodic oxidation film, a second electrode which faces the surface of the first electrode having the anodic oxidation film and a layer of a solid electrolyte which is placed between the first and second electrodes and comprises a salt of 7,7,8,8-tetracyanoquinodimethane with a cation of quinoline or isoquinoline the nitrogen atom of which is quarternarized with fluorinated alkyl groups.

A preferred fluorinated alkyl group is a group of the formula:

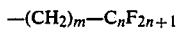
$-(CH_2)_m-C_nF_{2n+1}$ wherein m is an integer of 0 to 3 and n is an integer of 1 to 20.

Examples of the $C_nF_{2n+1}$ group are

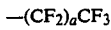
$-(CF_2)_aCF_3$ wherein a is an integer of 0 to 19,

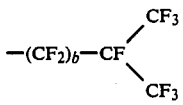
$-(CF_2)_b-CF\begin{matrix}CF_3\\CF_3\end{matrix}$ wherein b is an integer of 0 to 17,

$-[CFCF_2]_c CF_3$ with CF_3 substituent wherein c is an integer of 1 to 6, and

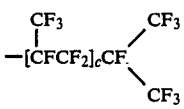
$-[CFCF_2]_d CF\begin{matrix}CF_3\\CF_3\end{matrix}$ with CF_3 substituent wherein d is an integer of 1 to 5.

BRIEF DESCRIPTION OF THE DRAWINGS

FIGURE is a cross section of a solid electrolytic capacitor of the present invention.

DETAILED DESCRIPTION OF THE DRAWINGS

The present invention will be illustrated by making reference to the attached drawing.

As shown in FIGURE, the basic structure of the solid electrolytic capacitor of the present invention comprises a first electrode 3 comprising a valve action metal plate 2 (e.g. aluminum, tantalum, titanium or alloys thereof) one surface of which has an anodic oxidation film 1 formed by anodic oxidation and a second electrode 4 (counter electrode). Between the first and second electrodes, placed is a layer of solid electrolyte 5. According to the present invention, the solid electrolyte is a complex salt of TCNQ with a cation of quinoline or isoquinoline the nitrogen atom of which is quarternarized with the fluorinated alkyl groups.

PREFERRED EMBODIMENT OF THE INVENTION

The present invention will be further explained by following examples.

EXAMPLE 1

As an electrolyte, a TCNQ complex salt with isoquinoline the nitrogen atom of which is quarternarized by $-C_4F_9$ or $-CH_2CH_2C_6F_{13}$ was finely ground. A suitable amount of the ground salt was filled in an aluminum can case of 10 cm in diameter and 11 mm in height and molten on a hot plate kept at 250° C.

A roll unit of a winding type aluminum electrolytic capacitor (rated capacity of 3 μF at 16V: rated capacity of 100 μF at 16V), the edge surface of which had been subjected to chemical conversion treatment, was dipped in the molten electrolyte to fully impregnate the electrolyte in the capacitor. The impregnation was carried out 40 seconds after placing the aluminum can case filled with the electrolyte on the hot plate. It was then cooled in the air.

The unit was placed in an aluminum case, and an epoxy rein was poured from an upper opening followed by heat treatment at 80° to 100° C. for 2 hours to seal the opening.

Original characteristics of an capacitor utilizing, as an electrolyte, the TCNQ complex salt with isoquinoline quarternarized with $-CH_2CH_2C_6F_{13}$ at 120 Hz or 1 KHz, and change of capacity after kept standing at 125° C. for 1,000 hours with no load were measured. The results are shown in Table 1, in which the capacity value is an average of ten samples.

TABLE 1

|  | 120 Hz | | 1 KHz | | |
|---|---|---|---|---|---|
|  | C μF | tanδ % | C μF | tanδ % | ΔC 120 Hz |
| 3 μF capacitor | 2.9 | 0.5 | 2.85 | 2.0 | −5% |
| 100 μF capacitor | 98 | 2.0 | 91 | 8.5 | −8% |

In this Example, the capacitance of the prouduced capacitor was about 90% with that achieved by the liquid electrolyte being 100%.

The capacitor utilizing, as an electrolyte, the TCNQ complex salt with isoquinoline quarternarized with $-C_4F_9$ had substantially the same capacitor characteristics as above.

Further the capacitor utilizing, as an electrolyte, the TCNQ complex salt with quinoline quarternarized with $-C_4F_9$ or $-CH_2CH_2C_6F_{13}$ had substantially the same quality as above.

COMPARATIVE EXAMPLE 1

For comparison, a capacitor was prepared in the same manner as in Example 1 but using, as an electrolyte, the TCNQ complex salt with isoquinoline quarternarized with n-butyl groups. The results are shown in Table 2.

TABLE 2

|  | 120 Hz | | 1 KHz | | |
|---|---|---|---|---|---|
|  | C μF | tanδ % | C μF | tanδ % | ΔC 120 Hz |
| 3 μF capacitor | 2.7 | 0.03 | 2.55 | 1.5 | >30% |
| 100 μF capacitor | 88 | 1.5 | 82 | 7.0 | >40% |

EXAMPLE 2 AND COMPARATIVE EXAMPLE 2

By applying excess current through the capacitor, the electrolyte was decomposed, and a volume of generated HCN gas was measured. The results are shown in Table 3.

TABLE 3

|  | TCNQ salt | HCN gas (ppm/l) |
|---|---|---|
| Comp. Ex. 2 | N—n-butylisoquinolium(TCNQ)$_2$ | >2,000 |

TABLE 3-continued

| | TCNQ salt | HCN gas (ppm/l) |
|---|---|---|
| Example 2 | N—fluorinated alkylisoquinolium(TCQN)$_2$ | <100 |

As seen from the results in Table 3, the volume of generated HCN is far smaller in Example 2 of the present invention than in Comparative Example 2.

When a salt of TCNQ with isoquinoline quarternarized with a fluorinated alkyl group having different number of carbon atoms, a capacitor has substantially the same characteristics.

Further, when a corresponding salt of TCNQ with quinoline quarternarized with the fluorinated alkyl groups is used as an electrolyte, a capacitor has substantially the same characteristics.

According to the present invention, as an electrolyte, used is the TCNQ salt which contains, as a cation, quinoline or isoquinoline the nitrogen atom of which is quarternarized with the fluorinated alkyl groups. Therefore, the electrolyte has improved impregnation into and bonding with the anodic oxidation film a surface of which is etched to form micropores. Further, the heat stability of electrolyte is improved. Since at least a part of hydrogen atoms in the alkyl group is substituted with fluorine, formation of active hydrogen is decreased so that generation of cyanide gas such as HCN is suppressed.

What is claimed is:

1. A solid electrolytic capacitor which comprises a first electrode comprising a valve action metal plate one surface of which is covered by an anodic oxidation film, a second electrode which faces the surface of the first electrode having the anodic oxidation film and a layer of a solid electrolyte which is placed between the first and second electrodes and comprises a salt of 7,7,8,8-tetracyanoquinodimethane with a cation of quinoline or isoquinoline the nitrogen atom of which is quarternarized with fluorinated alkyl groups.

2. The solid electrolytic capacitor according to claim 1, wherein the fluorinated alkyl group is a group of the formula:

$$-(CH_2)_m-C_nF_{2n+1}$$

wherein m is an integer of 0 to 3 and n is an integer of 1 to 20.

3. The solid electrolytic capacitor according to claim 2, wherein the fluorinated alkyl group is a perfluorobutyl group.

4. The solid electrolytic capacitor according to claim 2, wherein the fluorinated alkyl group is a group of the formula: $-CH_2CH_2C_6F_{13}$.

* * * * *

UNITED STATES PATENT AND TRADEMARK OFFICE
CERTIFICATE OF CORRECTION

PATENT NO. : 4,828,738

DATED : May 9, 1989

INVENTOR(S) : Sohji TSUCHIYA et al.

It is certified that error appears in the above-identified patent and that said Letters Patent is hereby corrected as shown below:

In the heading of the patent, change the name of the second assignee from "Takomoto" to --Takemoto--.

Signed and Sealed this

Thirteenth Day of March, 1990

Attest:

JEFFREY M. SAMUELS

Attesting Officer

Acting Commissioner of Patents and Trademarks